April 6, 1948. R. D. McINTOSH 2,439,052
SHUTOFF VALVE MECHANISM
Filed Aug. 26, 1943
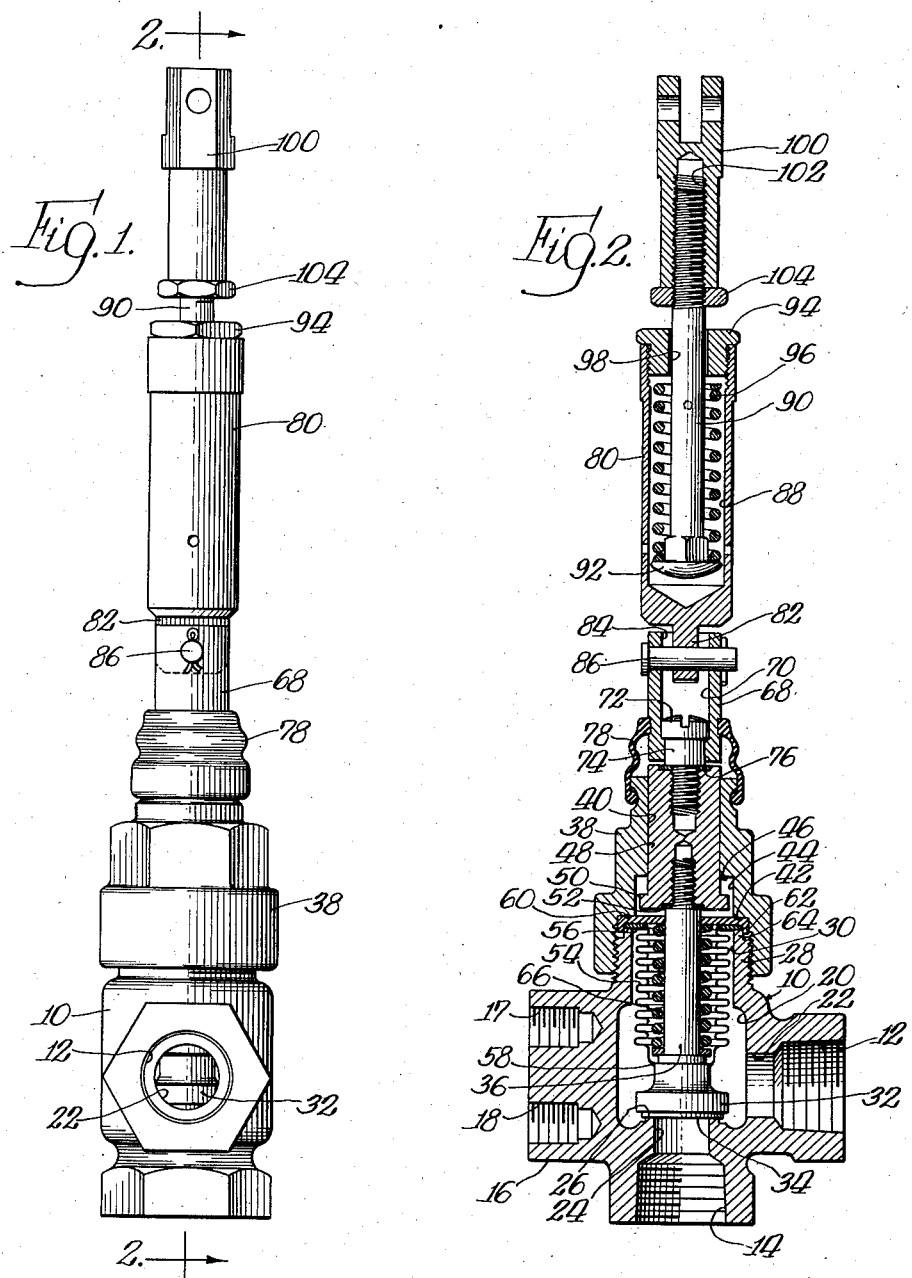
INVENTOR.
Robert D. McIntosh,
BY
Vernon D. Beehler
Atty.

Patented Apr. 6, 1948

2,439,052

UNITED STATES PATENT OFFICE 2,439,052

SHUTOFF VALVE MECHANISM

Robert D. McIntosh, River Forest, Ill., assignor to The Imperial Brass Manufacturing Company, Chicago, Ill., a corporation of Illinois Application August 26, 1943, Serial No. 500,052

2 Claims. (Cl. 251—31)

My invention relates to valves and particularly pull operated shutoff valves for liquid lines.

Among the objects of my invention is to provide a new and improved pull type liquid shutoff valve which is especially rugged in construction and which can be readily placed in a position remote from its point of operation.

Another object of my invention is to provide a new and improved pull type liquid shutoff valve wherein a valve stem having an elongated portion extending into the valve may be sealed without resort to the customary friction packing in order to provide relatively friction free movement for the operating stem.

Still another object of my invention is to provide a pull type shutoff valve having an elongated stem portion within the body of the valve wherein a relatively heavy spring acts in the combined capacity of pressing the valve into shutoff position, maintaining the valve and valve stem in a position of correct axial alignment and preventing lateral distortion of a flexible sealing member.

A further object of my invention is to provide a pull type shutoff valve with a body portion having disposed opposite the valve seat and coaxially therewith an elongated bore, a valve element, and a valve stem rigid with the valve element and having an elongated portion having a slidable but close fit within the bore to serve as a guide means retaining the valve element in proper axial position.

With these and other objects in view my invention consists in the construction, arrangement and combination of the various parts of my device whereby the objects contemplated are attained as hereinafter more fully set forth, pointed out in my claims, and illustrated in the accompanying drawings in which:

Figure 1 is an elevational view of my valve mechanism taken together with the attached swivels.

Figure 2 is a longitudinal section taken on the line 2—2 of Figure 1.

The subject matter of this invention is particularly adapted to heavy type engines which operate under extremely adverse conditions. The valve structure is made especially rugged so that it will withstand considerable use and abuse when used on machines such as caterpillar type tractors, half-track vehicles, construction machinery, and the like. Being of rugged construction and of an extremely simplified design, the valve is one which can be readily taken apart in the field, cleaned and reassembled without any more skill being necessary than that possessed by the average maintenance man.

The valve, being designed with a relatively short lift from its valve seat, requires that the movement of the stem be augmented a considerable amount so that an operator, under exceptional as well as normal conditions may be permitted to manipulate the handle a substantial amount in order to be able to easily feel the open and closed positions of the valve which would not be equally apparent if he were restricted to the very limited movement of the valve itself.

In the embodiment chosen to illustrate the principles of my invention, there is provided a valve body 10 having a passage 12 which may serve as an inlet and a passage 14 which may serve as an outlet. At one side, the body is provided with a boss 16 having two threaded apertures 17 and 18 by means of which the body can be securely mounted upon a stationary support. Within the valve body is a chamber 20 which communicates by means of an aperture 22 with the inlet passage and an aperture 24 with the outlet passage. Surrounding the passage 24 is an annular valve seat 26. On the body opposite the valve seat is a threaded extension 28 having an aperture 30 therein communicating with the valve chamber.

Within the chamber there is provided a valve element 32 having face 34 adapted to seat tightly upon the annular valve seat 26. The valve element is operated by means of a composite stem consisting in part of a lower stem section 36 directly attached to the valve element. A bonnet 38 is threadably mounted upon the threaded extension 28 and has a cylindrical walled recess 40 therein in axial alignment with the aperture 24. The bonnet is likewise provided with a recess 42, of relatively large diameter, and a small recess 44 having an annular bottom 46 adjacent the cylindrical passage.

The stem section 36 is threadably connected to a second or upper stem section 48 so that one forms a rigid extension of the other. The section 48 has a smooth sliding fit within the cylindrical passage 40. At its inside end the second stem section has a shoulder 50 which is designed to abut against the annular bottom 46 when the valve is in full open position. A lock washer 52 prevents ready separation of the stem sections.

In order to seal the valve stem, there is provided a flexible element here illustrated as a metal bellows 54 which has a rim 56 at the outer end and which at the central portion 58 is sealed to the valve element. As a guide for the lower valve stem section there is provided a flanged washer 60 forming, in effect, a partition across one side of the chamber and having an aperture in axial alignment with the valve element. The partition may be provided with an annular flange 62 adapted to surround and lie outside of an annular projection 64. The flange also serves as a means for centering the rim of the metal bellows. A relatively heavy coiled spring 66 has a position within the metal bellows surrounding the first valve stem section and is there compressed between the inside surface of the washer 60 at one end and upper surface of the valve element 32 at the other end.

The valve stem section 48 extends outwardly through the bonnet to the outside of the valve and has attached thereto at its outside end a swivel block 68 which has a central aperture 70 within which is positioned a head 72 of a swivel bolt 74 which is threadably attached to the outside end of the second section and secured in place by means of a lock washer 76. A flexible sleeve 78 is designed to fit snugly around the valve bonnet and the swivel block in order to prevent moisture from readily leaking into the operating parts of the valve stem.

There is further provided an overload unit comprising a spring housing 80 and a tongue 82 adapted to fit into a milled slot 84 on the swivel block where it is held in place by a pin 86. There is a spring chamber 88 within the spring housing and into the chamber there is extended a bolt 90 having its head 92 at the bottom of the chamber. A cap 94 is threadably attached to the open end of the spring chamber and serves to hold a spring 96 within the chamber. The cap has an aperture 98 extending axially through it to provide a guide for the shank of the bolt 90. Attached to the outside end of the bolt is a threaded take-up comprising a body 100 having a threaded aperture 102 therein adapted to receive the threaded portion of the bolt upon which is screwed a lock nut 104.

When the valve mechanism is assembled, the lower valve stem section with the attached metal bellows is inserted into the valve chamber so that the valve element seats upon the valve seat. In this position the rim 56 of the bellows fits on the projection 64 over which is applied the flanged washer 60. The washer, when properly centered by contact of its flange with the projection 64, serves to hold the bellows in place. The lower stem section which is attached to the free end of the bellows is centered in the central aperture of the washer and the rim of the bellows is confined and centered by being fitted within the flange of the washer. When these parts are in place, the bonnet 38 is screwed down tightly upon the threaded extension of the valve body until the rim of the bellows is sealed in place and confined by means of the washer and its annular flange. The heavy spring 66 will furthermore serve as a means of preventing the stem section 36 and the attached bellows from lifting laterally, thereby adding greatly to the life of the bellows.

It will be apparent from an examination of the composite valve stem that two swivels are present. One comprises the swivel block 68 which rotates about the bolt 74 and the other comprises the bolt 90 which is free to rotate relative to the spring housing 80. It should be noted in this connection that the spring 96 is of slightly heavier construction than the relatively heavy spring 66 in the valve chamber. The threaded take up element 100 is designed so that it can be attached to a cable or other stem actuating means, not shown, which may extend to a point remote from the location of the valve.

In operation the composite valve stem is pulled axially in a direction upwards as viewed on the drawings. When the composite stem is pulled upward the spring 66 being weaker than the spring 96 permits the valve element 32 to be lifted from its valve seat. The element moves a distance off the seat equal to the distance between the shoulder 50 and the bottom 46 of the recess 44. When this movement has occurred, the valve will be in full open position. In order to permit still further movement of the parts which move the valve stem, the spring 96 then contracts permitting portions of the composite stem including the bolt 90 and parts more remote from the valve body to move still further in an axial or pull direction. The amount of movement of the operating end of the composite valve stem can be controlled by the amount of compression or the length of the spring 96 and a corresponding depth for the spring chamber 88 in the spring housing 80.

It should further be noted that the end of the composite valve stem which is attached to the valve is made rigid so that the valve element will always seat in the same place upon its seat. For that reason the lower valve stem section 36 is rigidly attached in axial alignment with the upper valve stem section 48. The lower section is moreover restrained in its original position by the walls of the aperture in the flanged washer 60 thus forming a guide for that portion of the valve stem. Also, since the coiled spring 66 is relatively heavy it has a tendency to keep the valve stem in proper alignment since the flanged washer 60 is fastened in a level position.

To still further aid in the proper centering of the valve element, the upper valve stem section is provided with a relatively long shank slidably located in the correspondingly long cylindrical walled passage 40 which effectively prevents the upper valve stem section from tilting. Inasmuch as the remaining portions of the composite valve stem are swivelly attached to the initial two sections or otherwise loosely connected, no amount of distortion of the remote portions of the valve stem will have any effect upon the initial two sections thereby preserving the alignment of the operating parts of the valve.

Since all of the operating sections of the valve stem are encased within the valve body and the bonnet, there is very little likelihood of their being dislodged or forced out of alignment unless the bonnet or valve body itself should be subjected to abuse.

There has thus been provided a pull operated liquid valve mechanism having a flexible adjustable operating stem associated with operating parts of the valve housed within heavy walls of the body and bonnet so that the valve will remain in proper adjustment under extremely adverse conditions.

I claim as my invention:

1. In a valve mechanism a valve body having a chamber and outlet and inlet ports communicating therewith, a threaded extension on the body opposite one of said ports including an annular projection smaller in outside diameter than the base diameter of the threads, said extension having an aperture therein, a bonnet threadably secured upon the extension having a cylindrical walled passage therein, a valve seat in the port opposite the aperture and a valve member having a valve element normally seated on the valve seat and a pull operable stem assembly including two sections, a first section rigidly attached to the valve element and extending to a position adjacent the bonnet, a flanged and apertured washer having the flange surrounding said annular projection and turned toward the valve seat, said bonnet having a recess adapted to receive and position the washer, said first stem section having a smooth sliding fit in the washer aperture, a metal bellows positioned in the aperture surrounding said first stem section having a rim sealed between the washer and the annular projection on the body and having an extensible portion thereof attached in sealed relationship to the valve element, a relatively heavy coiled spring within the bellows surrounding said first stem section and confined endwise between the valve element and the washer, a second stem section having a cylindrical shape rigidly attached to the first stem section and spaced from the washer and having a relatively smooth sliding fit within the passage in said bonnet, and an engaging element on the second stem section adapted to have contact with the bonnet in open position thereby limiting outward movement of the stem and valve.

2. In a valve mechanism, a packless valve assembly comprising a body having a valve chamber, inlet and outlet ports communicating therewith and an aperture also communicating with the valve chamber, a valve seat formed in the valve body intermediate the inlet and outlet ports and opposite and concentric with the aperture in the valve body, a pull operated valve element adapted for cooperation with said valve seat having a composite stem comprising a first section integral with the valve element and extending through the aperture coaxially therewith, and a second section forming an extension of the first section rigidly and threadedly secured thereto, said second section being cylindrical and substantially greater in axial dimension than in diametrical dimension, the stem having an element thereon adapted to engage a stationary part of the valve body in valve-open position to limit endwise movement of the valve element, a partition across the aperture centrally apertured for the projection therethrough of the first section of the stem and providing a guide therefor, a bonnet threadedly secured to the valve body having an elongated cylindrical bore for the reception and extension therethrough of the second section of said valve stem, said second section and the bore in said bonnet having a close sliding fit to provide an elongated bearing surface for retaining the valve element properly positioned, a flexible sealing member within the body having the edges thereof sealed at the walls of the chamber, thereby closing one side of the chamber, the mid-portion of said sealing member being sealed around the valve element, and a relatively stiff helical compression spring surrounding the first section of the stem and bearing at one end against the valve element and at the other end against said partition for normally holding the valve element against the seat, said spring having an internal diameter only slightly larger than the external diameter of the first section of said valve stem.

ROBERT D. McINTOSH.

REFERENCES CITED

The following references are of record in the file of this patent:

UNITED STATES PATENTS

| Number | Name | Date |
|---|---|---|
| 1,603,593 | Goodhue | Oct. 19, 1926 |
| 1,718,530 | Cook | June 25, 1929 |
| 1,959,259 | Zerk | May 15, 1934 |
| 1,992,902 | McIntosh | Feb. 26, 1935 |
| 2,007,569 | Hoke | July 9, 1935 |
| 2,009,433 | Carrol | July 30, 1935 |
| 2,048,858 | Gibbs | July 28, 1936 |

FOREIGN PATENTS

| Number | Country | Date |
|---|---|---|
| 12,426 | Great Britain | 1898 |
| 366,088 | Italy | 1938 |